Nov. 14, 1944. A. MILLER 2,362,918
AUTOMATIC SAFETY CONTROL
Filed Dec. 22, 1939 4 Sheets-Sheet 1
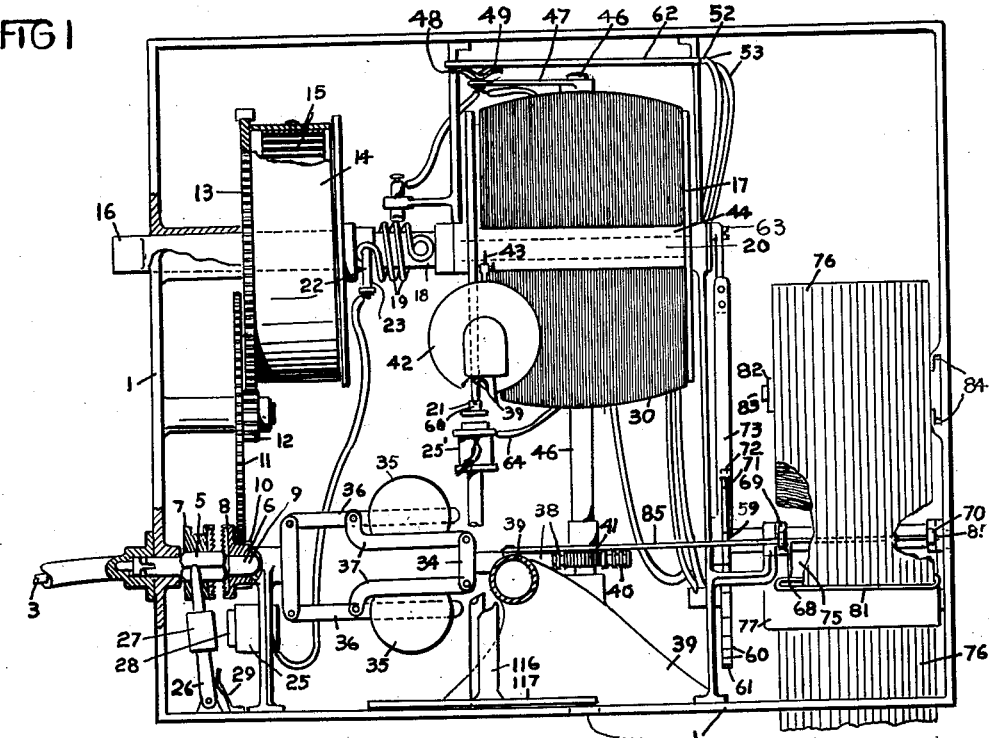
INVENTOR.
ARTHUR MILLER.
BY Paul A. Talbot.
ATTORNEY.

Nov. 14, 1944.　　　　A. MILLER　　　　2,362,918
AUTOMATIC SAFETY CONTROL
Filed Dec. 22, 1939　　　4 Sheets-Sheet 2

INVENTOR.
ARTHUR MILLER.
BY
Paul A. Talbot.
ATTORNEY

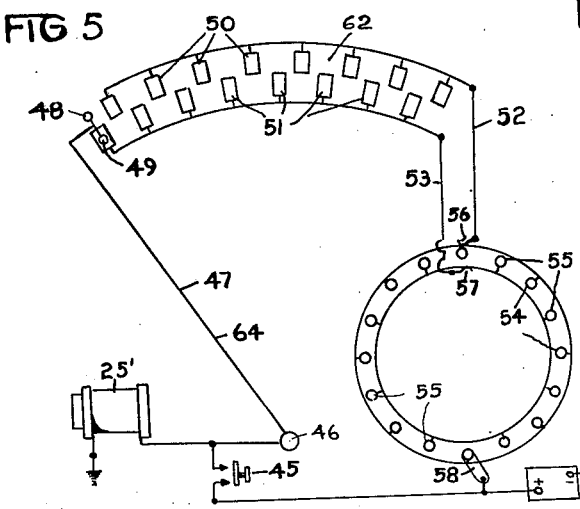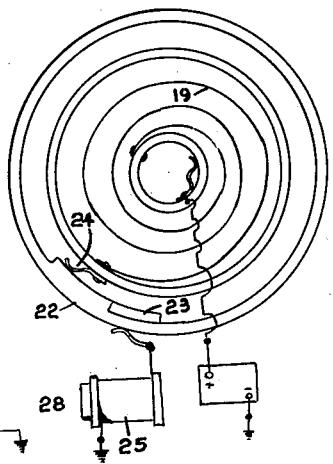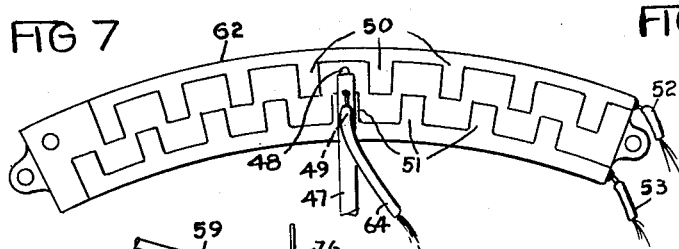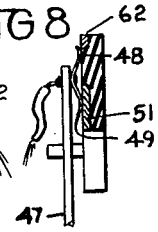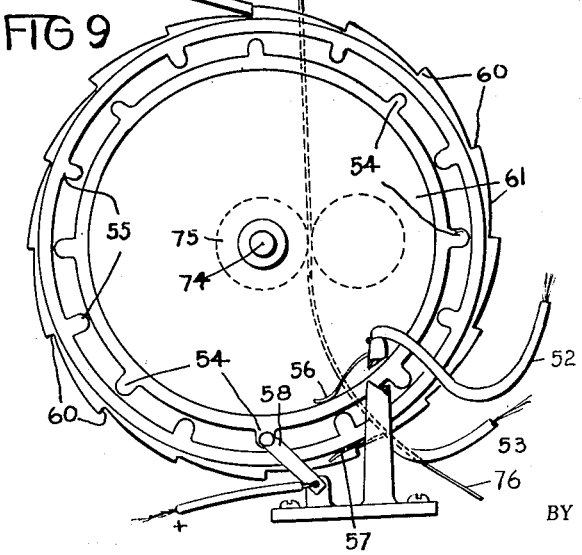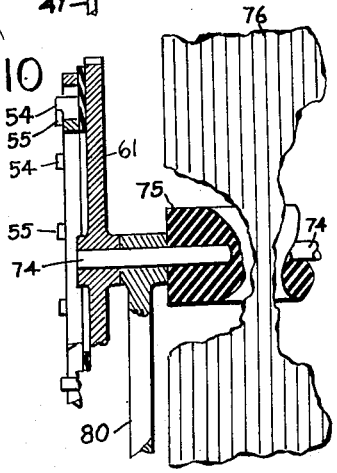

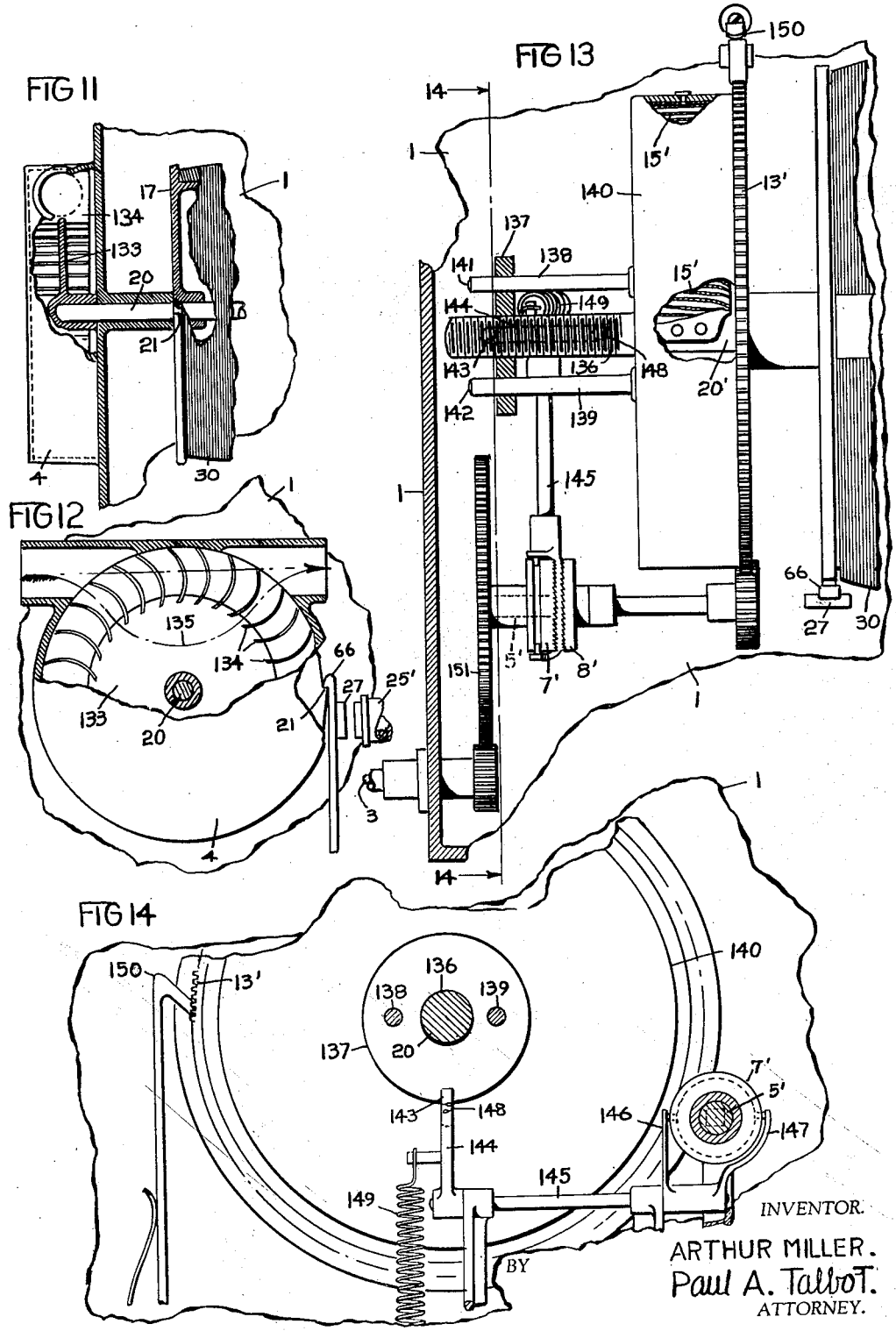

Patented Nov. 14, 1944

2,362,918

UNITED STATES PATENT OFFICE 2,362,918

AUTOMATIC SAFETY CONTROL

Arthur Miller, Leavenworth County, Kans.

Application December 22, 1939, Serial No. 310,494

4 Claims. (Cl. 177—311.5)

My invention is a device for indicating and recording the velocity for controlling vehicles, air ships, trains, locomotive engines, and particularly to prevent accidents by designating the safe maximum and thus limiting speed, and in other ways warning and assisting in controlling the conveyance even though the operator may be inexperienced or careless, and among its objects are:

To inform the operator the safe conditions for operating the conveyance without taking his attention or sight from the path of travel.

A simple device for controlling the safety of travel of all forms of conveyances.

A device which is constructed for universal application to all forms of conveyances.

I accomplish these and other objects by the construction herein described and shown in the accompanying drawings forming a part hereof in which:

Fig. 1 is a plan view of my device.

Fig. 2 is a front elevation and partial section of my device.

Fig. 5 is a wiring diagram of the audible indicator and warning control.

Fig. 6 is a wiring diagram of the audible record spring cut out mechanism.

Fig. 7 is a detail of the speed audible indicator commutator.

Fig. 8 is a fragmentary sectional detail of the commutator and alternating arm.

Fig. 9 is a detail of the record feed mechanism and audible control.

Fig. 10 is a fragmentary sectional elevation detail of the feed mechanism and audible control.

Figs. 11 and 12 are details of a modification showing a direct turbine record drive.

Figs. 13 and 14 are modified details of the winding mechanism.

Figure 3:
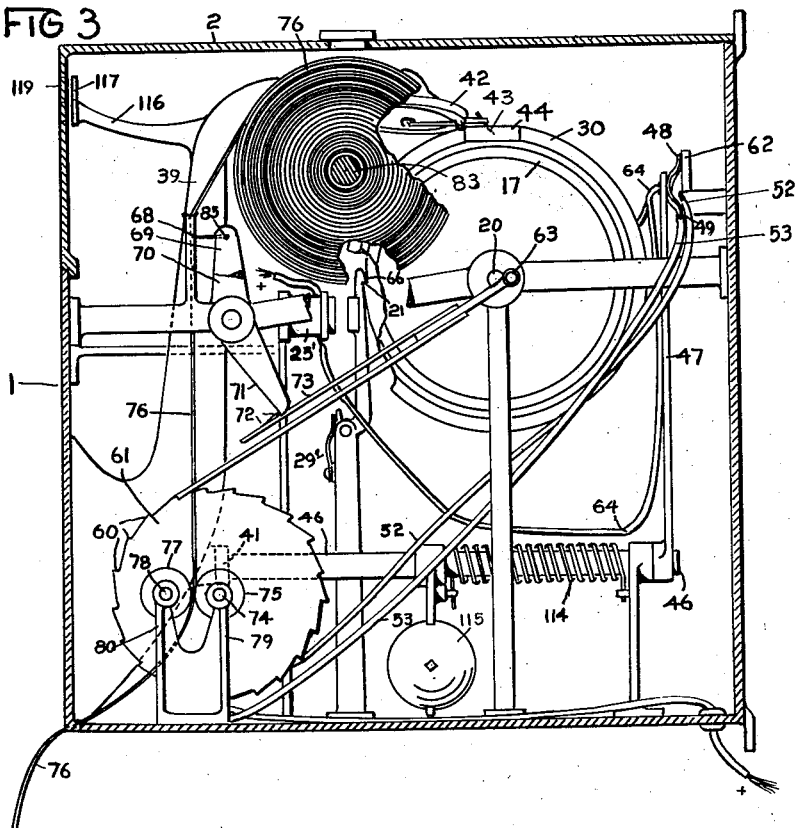
Fig. 3 is a section and elevation of my device.

The matter contained in this specification and shown in the drawings is a continuation in part of the matter filed with my application February 4, 1938, having Serial Number 188,703, titled Automatic safety control and having the Patent Number 2,273,058, of which a part of this application is a division.

While I have herein shown modifications of some of the parts of my device, it will be apparent after studying the disclosure herein that numerous changes and other modifications may be made in the detailed construction to suit different conditions of operation, and also to accomplish the equivalent results and functions of the parts.

The manner of driving the running parts for instance may vary such as employing a turbine operated by the exhaust from the engine, a connection to the operating mechanism of the conveyance or a drive operated by an electric motor.

In the specification to follow, one of the constructions is described in detail and its simplified form so that it may be more easily understood.

Similar reference characters refer to similar parts throughout the several views of the drawings and in the specification to follow.

Accidents are usually the result of incompetence or carelessness of the operator of conveyances. The loss of life and damage resulting from accidents in many cases may be minimized by the operator or pilot knowing the safe speed for the conveyance for the conditions encountered at each moment.

The lack of experience or judgment of operators may be compensated for by the use of my device, by telling the operator that the speed being traveled is too great for safety in much the same way as an experienced instructor would when at the side of an inexperienced operator. This is less confusing in effecting the desired result than to provide only a visible speed indicator requiring the operator to take his eye off the road to see the speed being traveled. My device gives the speed and a warning about the speed audibly or a spoken statement of the speed and that it may be too fast or is approaching a dangerous point for the road condition which may be curved or vision poor ahead.

The many advantages of my device will be seen after a better understanding of its construction and uses. The modification of many of its parts will at once be obvious to persons skilled in mechanical and electrical mechanisms and I do not wish to be limited to the specific construction herein described. For instance, the arrangement of the parts as well as their number and size and type may, in many instances, be altered without diminishing the usefulness of purposes for which they are intended.

This specification for the purpose of clarity and that my invention may be better understood is limited in its description and generally is confined to one construction rather than the numerous equivalent constructions which may produce a desired function.

My device preferably comprises a housing into which many of the parts are assembled. The housing is provided with a removable top 2 and such other openings, doors, etc. as may be desirable in caring for or replacing the parts and for inspection.

The mechanism may be operated or driven by the flexible shaft 3 such as usually connects to automobile speedometers or may in part be operated by an exhaust turbine 4 as shown in the modification shown in Figs. 11 and 12 as may be later disclosed.

The flexible shaft 3 engages the spline or square portion 5 of the shaft 6 on which the movable clutch member 7 is slidably mounted. The movable clutch member 7 engages the clutch member 8 which revolves about the round portion 9 of the shaft 6, the clutch member 8 is provided with the pinion 10 which engages the gear 11 secured to the pinion 12 engaging the spring housing gear 13 which is secured to the spring housing 14 and spring 15, the other end of which is secured to and drives the shaft 16 operating the record drum 17 by means of the stop spring shaft 18 through the torsion spring 19 which engages the drum shaft 20 to which is secured the record drum 17 and stop 21. The torsion spring is sufficiently greater in torsional strength than the spring 15 to only move after said spring 15 is completely wound up, thereby causing said spring shaft, upon which is mounted the conductor 22 and insulated segment 23. Thus, when the spring 15 is completely wound up further movement will cause the shaft 16 to revolve overcoming the spring 19 thereby causing the brush 24 to engage the insulated segment 23 breaking the circuit and de-energizing the magnet 25 and releasing the lever 26 and its core 27 which normally engages the core 28 of said magnet 25. The lever 26 is forced by the spring 29 to release the movable clutch member 7 from the clutch member 8 which it normally engages while winding the spring 15 to operate the audible record 30 carried by the record drum 17. The lessening of the torsion by the operation of said record 30 causes the brush 24 to contact the conductor 22 and the clutch member 7 to engage the clutch member 8 thereby again winding up the spring 15.

Figure 4:
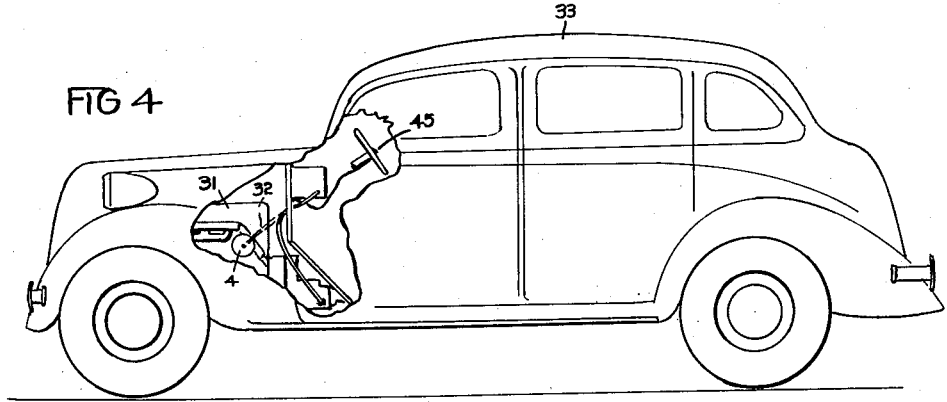
Fig. 4 is a general view showing one of the applications of my device.

In Fig. 4 of the drawings, I have shown a modification in which a turbine 4 operated by the exhaust of the engine 31 drives the gear 13 and winds the spring 15 through a flexible shaft 32 driven by said turbine when it has sufficient torque to do so, the turbine not revolving when the spring 15 is wound up.

The shaft 6 which revolves continuously while the conveyance 33 is in motion is connected to and revolves the governor 34 which by centrifugal force causes movement of its balls 35 secured to the arms 36 and links 37 to move the shaft 38, to which said links are attached, axially thereby swinging the sound tube or horn 39. The grooves or circular rack 40 on said shaft 38 engage the segmental rack 41 secured to said horn.

The horn and sound tube 39 are secured to the sound reproducer 42 having a needle 43 which travels in the grooves of the record 30 causing words of warning to be spoken as of the human voice and the speed of the vehicle to be audibly stated in much the same manner as is customary with phonographs except that the record of my device has parallel grooves and not the usual spiral grooves of the phonograph record. My record 30 is provided with an axial blank portion 44 not touched by the needle 43 thus permitting the needle to travel axially while the record is at rest or while in motion to any of the sound producing grooves on the record which depend entirely on the speed of the conveyance and the rate of revolution of the governor 34.

I have shown a drum type of audible record but a disc record, by slight modifications, may be used and in such a modification a radial blank space may be provided and likewise circular grooves may serve the purpose of sounding the short statements of speed or warning which correspond to each groove. In either case, the blank space into which the grooves begin and terminate is so positioned as to register with the stop 21 when the record is at rest. A record having no blank portion could be used but the changing of the audible short sentences would not be complete.

The stop and starting mechanism for the record is preferably controlled by the speed of the conveyance periodically, the frequency of the periods depending on the frequency of a change in speed. I have, however, provided a push button 45 on the steering wheel or otherwise convenient to the operator which also may at any time operate the audible record.

The operation of the record may be followed by referring to the wiring diagram, shown in Fig. 5 as well as in the several views showing the parts.

Mounted on the shaft 46 to which the horn and segmental rack are secured is the arm 47 having at its free end the double brushes 48 and 49, engaging the upper commutator segments 50 and lower commutator segments 51. All of the upper segments 50 are connected by the conductor 52 and all of the lower segments 51 are also connected to each other by the conductor 53. The conductor 52 connects the upper segments to the annularly disposed contacts 54 each of which alternates with the annularly disposed contacts 55 connected to the lower segments 51 by the conductor 53. The connections by the conductors 52 and 53 are made to the electrically separated contacts 54 and 55 by the brushes 56 and 57. Current is supplied to one group or the other alternate group of contacts by the single brush 58 from the source of electrical energy which may be a battery.

The contacts 54 and 55 are intermittently operated by the pawl 59 engaging the teeth 60 of the wheel 61 on which said contacts 54 and 55 are mounted, each tooth registering with a contact thus alternately supplying energy to the upper segments and lower segments of the commutator 62.

The pawl 59 is secured to and operated by the crank pin 63 secured to the record drum shaft 20 and revolves said wheel one tooth each revolution of the record and drum shaft.

The arm 47 having the double brushes contacting the commutator segments carries the conductor 64 which energizes the magnet 25' which operates the stop pawl 66 which engages the stop 21 so that when either of the double brushes engages one of the segments of the commutator, the pawl 66 is withdrawn from said stop causing the record to turn one revolution which in doing so moves the wheel 61 and thus disconnects the source of supply to said magnet while the record is making its revolution and permitting the spring 29' to return the stop pawl 66 to stop the record upon completing its single revolution.

It may be seen, therefore, that the arm 47 must move to the next commutator segment in either direction before the record is again released and that this movement of said arm which is operated by the governor and the speed of the conveyance is only accomplished by a change of speed either faster or slower than caused the record to make its last revolution.

I have, however, provided the push button 45 which may be contacted to release the stop pawl 66 at any time and thus render an audible statement from the record.

By holding the button down, a repetition of the speed and other audible remarks from the record may be heard regardless of the speed or change of speed of the conveyance.

The crank pin 63, in addition to operating the pawl 59 when moving in the opposite direction or on its return stroke, moves the perforator 68 which is slidably carried in the arms 69 and 70 secured to and operated by the lever 71 which engages the teeth 72 of the yielding pawl 73 which is connected to and operated by the crank pin 63.

The wheel 61, in addition to carrying the contacts 54 and 55, is directly connected to the shaft on which is mounted the resilient feed roll 75 which engages the record paper 76 between it and the resilient idle roll 77 rotatably mounted on the shaft 78. Both shafts 74 and 78 are mounted to revolve in the brackets 79 and 80 secured to the housing 1.

The record paper is fed through the guides 81 of the perforator from the record paper roll 82 detachably supported and revolvable on the detachable stud 83 which is removable from the T slot 84 for renewing the record roll when desired.

The perforator 68 is secured to the longitudinally slidable tie rod 85 which is connected to and moved by the sound arm and horn 39 which is swung by the governor 34 which is effected by the speed of the conveyance so that the perforator pierces the paper record each revolution of the audible record, thereby recording permanently the speed the conveyance has traveled.

The paper record may be ruled and the lines marked to show the "miles per hour" speed of the conveyance.

The speed governor 34 may be adjusted to accurately register the speed of the conveyance as the centrifugal force acting on the governor balls may be resisted to any degree by the torsion spring 114 or the counter weight 115, mounted on the shaft 46.

The sound arm 39 is provided with a bracket 116 securing it to the visible speed indicator 117 on which are the numerals 118 designating the speed at which the conveyance is traveling in much the same manner as the speedometer commonly used in automobiles.

The reading of the numerals is facilitated by providing the opening 119 in the front of the housing 1. The miles traveled both for the trip and total mileage traveled by the conveyance may also in like manner be shown as desired by connecting the flexible shaft 3 to the usual revolution counters employed for such purposes.

In Figures 11 and 12, I have shown the record drum 17 mounted on its shaft 20 which also is secured to the rotor 133 of the turbine 4 operated by exhaust from the engine 31. When the turbine turns the record 30 and drum 17, the exhaust gases flow straight through as shown by the arrow, while when the record is stopped by the pawl 66 engaging the stop 21 as hereinbefore described, the gases will flow around the stationary rotor 133 and its blades 134 as indicated by the broken line 135.

Referring to Figures 13 and 14, I have shown a modification of the record spring winding mechanism in which the drum shaft 20' is directly secured to the spring 15', and is extended beyond the spring to provide the threads 136 which engage the nut 137, which is slidably mounted on the studs 138 and 139 which are secured to the spring housing 140 and revolves with it when the spring 15', which is secured at its outer end to said spring housing is being wound by means of the gear 13' which is secured to said housing.

When the spring is being wound and the drum shaft 20' and its threads 136 are stationary, the nut is revolved on the threads and slides outwardly toward the ends 141 and 142 of said studs 138 and 139 until said nut 137 contacts the arm 143 of the bifurcated lever 144 which is secured to the shaft 145 at one end of said shaft to which is secured the clutch operating levers 146 and 147 at the other end of said shaft which move the movable clutch member 7' out of engagement with the clutch member 8' which is secured to and revolves the gears meshing with the spring winding gear 13' and causing the gear 13' to stop winding the spring 15'.

When the record 30 and its drum shaft 20 are released to revolve the thread revolves causing the nut, which is stationary after having wound the spring 15', to slide on said studs 138 and 139 away from their ends 141 and 142 until contacting the arm 148 which is secured to and moves the lever 144 and the clutch operating lever 146 and 147, secured to said lever by means of the shaft 145, causing the clutch members 7' and 8' to again engage and to again wind up the spring 15'.

The winding of the spring, it will be seen, may be repeated by the mechanism above described, each time the nut 137 contacts the arm 148, and the winding will cease each time the nut contacts the arm 143, both of said arms being secured to the bifurcated lever 144.

The lever 144 is thrown off center by means of the spring 149 which causes the movable clutch member 7' to completely engage the clutch member 8' or to be completely disengaged from said member when thrown by said spring 149 and the lever 144, depending on which of its arms 143 or 148 are contacted by said nut 137.

The pawl 150 holds the gear 13' from revolving after the spring 15' has been wound. And the pawl 66 stops and releases the record and drum shaft which revolves it by means of the spring 15' as herein described.

The flexible shaft 3 may be connected directly to the spline shaft 5 or through gears 151 as shown in Figures 13 and 14.

While I have herein described in detail the construction and operation of my device, it may be obvious after a study of this description, to alter and add to the parts to suit them to the many uses to which my invention may be suited. I therefore do not wish to be limited to any specific construction, as I may wish to depart therefrom within the scope of the appended claims which set forth my invention.

I claim:

1. In a conveyance announcer, a housing, a record of the human voice revolvable in said housing, driving means for revolving said record, sound transmitting means, means responsive to the speed of the conveyance for positioning the said sound transmitting means in a position with respect to said record which is a function of the speed of the conveyance, electrical means for releasing said record and permitting it to make one revolution, a pair of brushes secured to and movable with said transmitting means, two sets of commutator segments, each set being arranged to be contacted by a corresponding one of said brushes, said commutator segments being alternately disposed so that the brushes alternately contact their commutator segments on a sufficient increase or decrease in speed of the conveyance, a circuit including said electrical releasing means and a source of electric current, contact means to alternately connect one or the other of said sets of commutator segments and the corresponding brush in said circuit, and means operated on each rotation of said record for operating said contact means to disconnect one set of commutator segments and its brush from said circuit and connect the other set of commutator segments and the corresponding brush in said circuit, whereby the record will be released and make one revolution each time the speed changes a predetermined amount.

2. In a conveyance announcer, a housing, a record of the human voice revolvable in said housing, driving means for revolving said record, sound transmitting means, means responsive to the speed of the conveyance for positioning the said sound transmitting means in a position with respect to said record which is a function of the speed of the conveyance, electrical means for releasing said record and permitting it to make one revolution, a pair of brushes secured to and movable with said transmitting means, two sets of commutator segments, each set being arranged to be contacted by a corresponding one of said brushes, said commutator segments being alternately disposed so that the brushes alternately contact their commutator segments on a sufficient increase or decrease in speed of the conveyance, a circuit including said electrical releasing means and a source of electric current, contact means to alternately connect one or the other of said sets of commutator segments and the corresponding brush in said circuit, and means operated on each rotation of said record for operating said contact means to d'sconnect one set of commutator segments and its brush from said circuit and connect the other set of commutator segments and the corresponding brush in said circuit, whereby the record will be released and make one revolution each time the speed changes a predetermined amount, and a manually operated switch releasing said record to move independently of the contacts made with said segments.

3. In a conveyance announcer, a housing, a record of the human voice revolvable in said housing, driving means for revolving said record, sound transmitting means, means responsive to the speed of the conveyance for positioning the said sound transmitting means in a position with respect to said record which is a function of the speed of the conveyance, electrical means for releasing said record and permitting it to make one revolution, a pair of brushes secured to and movable with said transmitting means, two sets of commutator segments, each set being arranged to be contacted by a corresponding one of said brushes, said commutator segments being alternately disposed so that the brushes alternately contact their commutator segments on a sufficient increase or decrease in speed of the conveyance, a circuit including said electrical releasing means and a source of electric current, contact means to alternately connect one or the other of said sets of commutator segments and the corresponding brush in said circuit, and means operated on each rotation of said record for operating said contact means to disconnect one set of commutator segments and its brush from said circuit and connect the other set of commutator segments and the corresponding brush in said circuit, whereby the record will be released and make one revolution each time the speed changes a predetermined amount, said segments disposed in a pair of rows swept by said brushes.

4. In a conveyance speed announcer having a record of the human voice to announce the speed of the conveyance, and means rotating said record and means limiting said record to one revolution, electrical releasing means controlled by the speed of the conveyance permitting said record to revolve to announce the speed of the conveyance, means operatively connected to and affected by the movement of said record to break the circuit of said releasing means, a second circuit and means connecting said second circuit operatively to and moved with said record, said second circuit releasing said record only when a change in speed of said vehicle has moved said means electrically first releasing said record, said record releasing means comprising contacts moved by said record rotating means alternately opening said first circuit after releasing said record and closing said second circuit to release said record when the speed of said conveyance has changed to faster or slower.

ARTHUR MILLER.